(12) United States Patent
Cohen et al.

(10) Patent No.: US 9,858,708 B2
(45) Date of Patent: Jan. 2, 2018

(54) CONVEX POLYGON CLIPPING DURING RENDERING

(71) Applicant: Microsoft Technology Licensing, LLC, Redmond, WA (US)

(72) Inventors: Miles Cohen, Seattle, WA (US); Meng Yang, Bellevue, WA (US); Amar Patel, Kirkland, WA (US); Leonardo Blanco, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 14/483,139

(22) Filed: Sep. 10, 2014

(65) Prior Publication Data
US 2016/0071315 A1    Mar. 10, 2016

(51) Int. Cl.
*G06T 15/30* (2011.01)
*G06T 11/20* (2006.01)
*G06T 15/00* (2011.01)

(52) U.S. Cl.
CPC ......... *G06T 15/30* (2013.01); *G06T 11/203* (2013.01); *G06T 15/005* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 5,231,695 A | 7/1993 | Harrington | |
| 5,613,050 A * | 3/1997 | Hochmuth | G06T 15/005 345/422 |
| 5,689,627 A | 11/1997 | Arai et al. | |
| 5,903,270 A * | 5/1999 | Gentry | G06T 15/10 345/419 |
| 7,580,035 B2 | 8/2009 | Sathe et al. | |
| 7,903,108 B2 | 3/2011 | Jacobson | |
| 8,698,837 B2 | 4/2014 | Kilgard | |
| 2003/0193497 A1 | 10/2003 | Yhann | |
| 2004/0027348 A1 | 2/2004 | Fenney | |
| 2006/0290715 A1* | 12/2006 | Cui | G06T 15/40 345/620 |
| 2007/0206027 A1* | 9/2007 | Chen | G06T 15/30 345/620 |
| 2010/0091018 A1 | 4/2010 | Tatarchuk et al. | |
| 2010/0141659 A1* | 6/2010 | Bourd | G06T 11/203 345/442 |

(Continued)

OTHER PUBLICATIONS

"International Search Report & Written Opinion Issued in PCT Application No. PCT/US2015/049266", dated Nov. 17, 2015, 11 Pages.

(Continued)

*Primary Examiner* — Andrew G Yang
(74) *Attorney, Agent, or Firm* — Arent Fox LLP

(57) ABSTRACT

In one example, a graphic computing device may apply a clipping technique to accurately and efficiently render a graphic data set. A central processing unit may generate a convex polygonal clip from a two-dimensional polygon. The central processing unit may calculate a clipping plane for a convex polygonal clip based on an edge of the convex polygonal clip. A graphics processor may apply the convex polygonal clip in a pixel shader.

19 Claims, 16 Drawing Sheets

(56) References Cited

U.S. PATENT DOCUMENTS

2013/0300740 A1* 11/2013 Snyder ................... G06F 3/016
                                                                   345/420

OTHER PUBLICATIONS

McGuire, M., "Efficient Triangle and Quadrilateral Clipping within Shaders", In Journal of Graphics Tools, vol. 15, No. 4, Nov. 8, 2011, 9 pages.
"CSS Transforms Module Level 1", Retrieved at: <<http://www.w3.org/TR/css3-transforms/>>, Nov. 26, 2013, 46 pages.
Segal, et al., "The OpenGL Graphics System: A Specification (Version 1.4)", In Proceedings of Silicon Graphics, Feb. 10, 2006, 312 pages.

\* cited by examiner

| INTERIOR PIXEL 810 | INCLUDED BOUNDARY PIXEL 830 | EXCLUDED BOUNDARY PIXEL 840 | EXTERIOR PIXEL 820 |
|---|---|---|---|
| INTERIOR PIXEL 810 | INCLUDED BOUNDARY PIXEL 830 | EXCLUDED BOUNDARY PIXEL 840 | EXTERIOR PIXEL 820 |
| INTERIOR PIXEL 810 | INCLUDED BOUNDARY PIXEL 830 | EXCLUDED BOUNDARY PIXEL 840 | EXTERIOR PIXEL 820 |
| INTERIOR PIXEL 810 | INCLUDED BOUNDARY PIXEL 830 | EXCLUDED BOUNDARY PIXEL 840 | EXTERIOR PIXEL 820 |

*800*
Figure 8

CONVEX POLYGON CLIPPING DURING RENDERING

BACKGROUND

A computing device may process a graphic data set for presentation to a user. The graphic data set may be a digital image, an icon, text, or a digital video set. The computing device may have a graphics processing unit to prepare the graphics data set for presentation. A graphics processing unit may have a set of one or more processors specifically dedicated to processing graphics data.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to applying a clipping technique to accurately and efficiently render a graphic object. A central processing unit may generate a convex polygonal clip from a two-dimensional polygon. The central processing unit may calculate a clipping plane for a convex polygonal clip based on an edge of the convex polygonal clip. A graphics processing unit may apply the convex polygonal clip in a pixel shader.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 4:
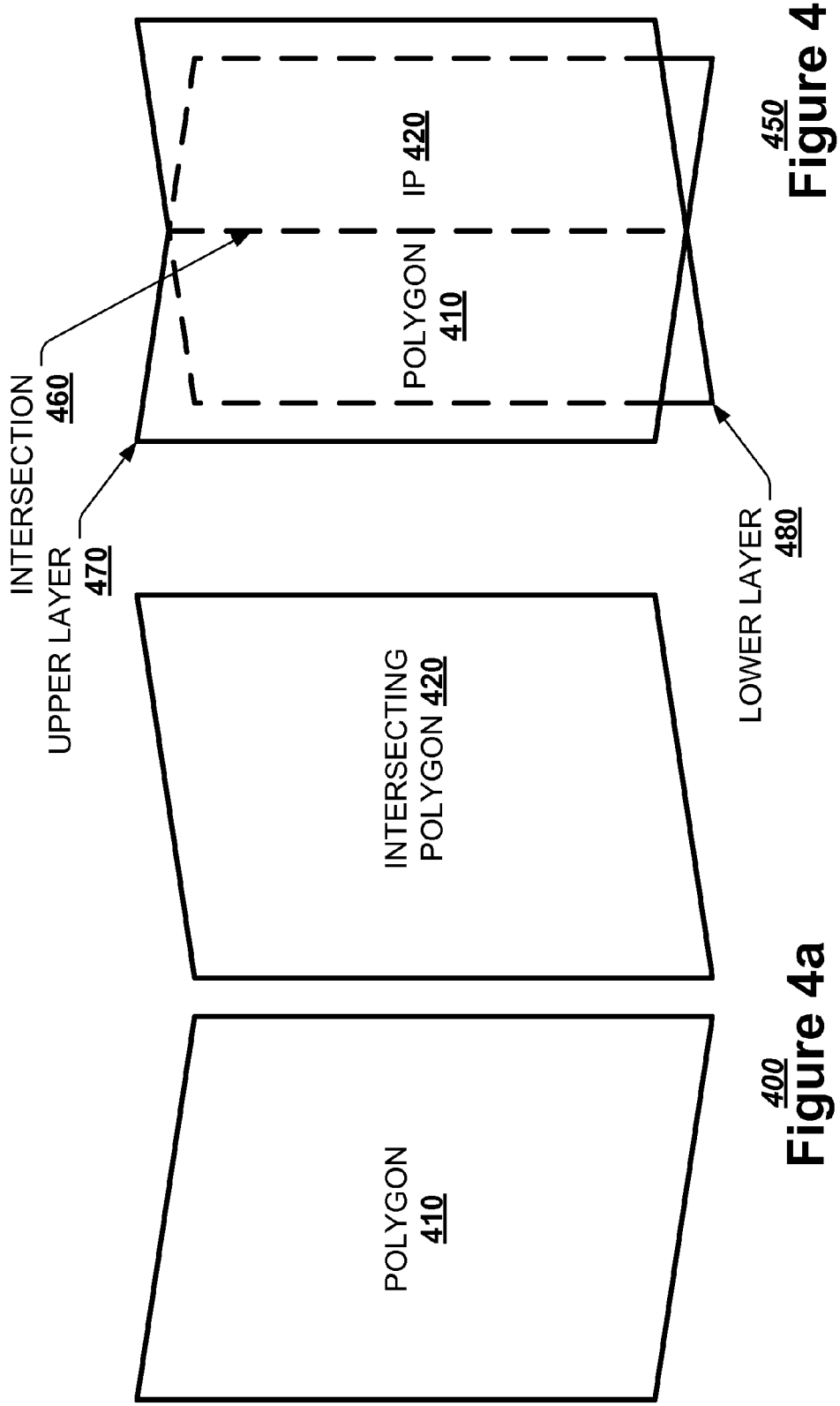

FIGS. 4a-b illustrate, in block diagrams, exemplary three-dimensional polygon sets.

Figure 5:
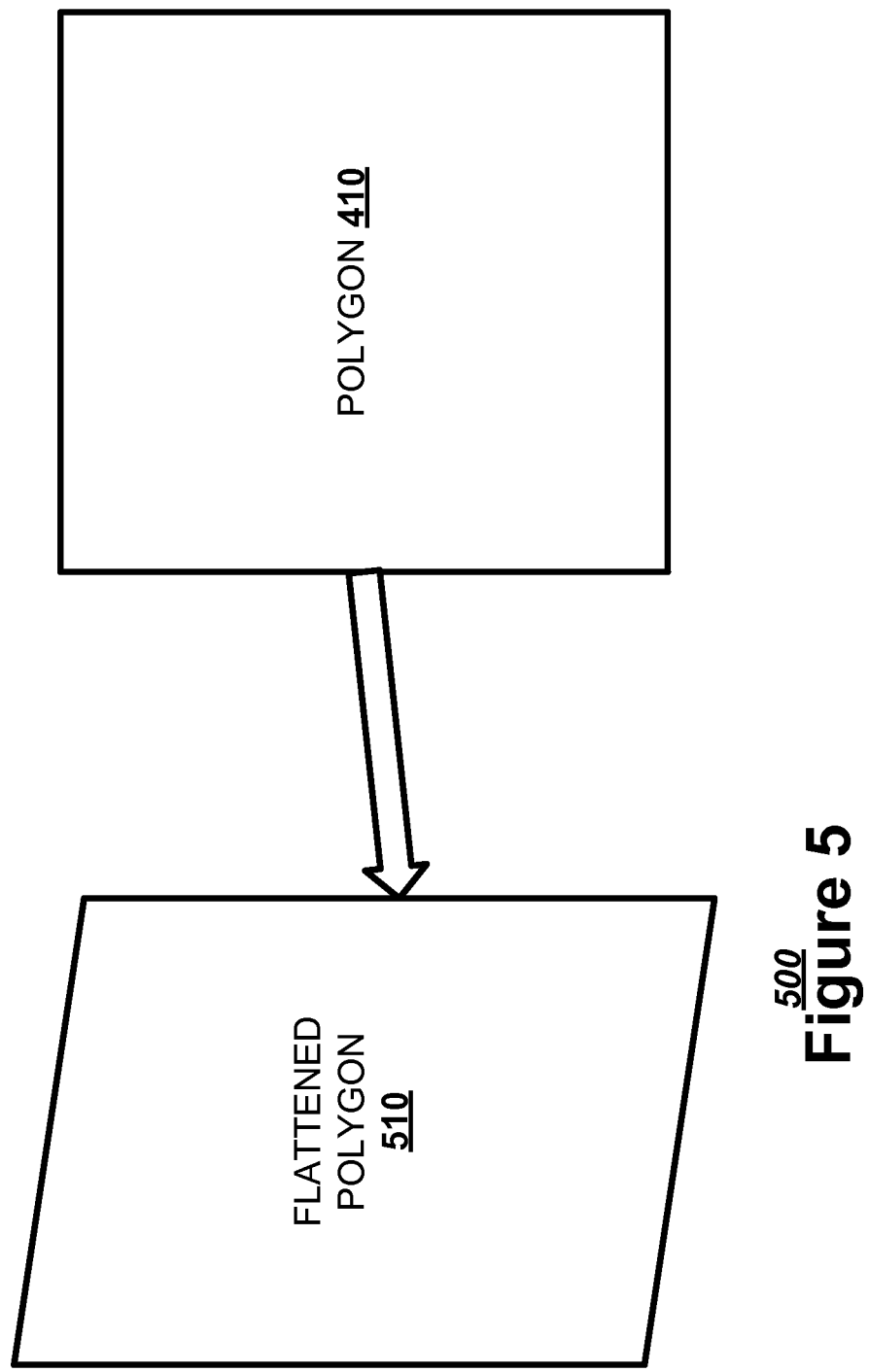

FIG. 5 illustrates, in a block diagram, an exemplary polygon flattening.

Figure 6:
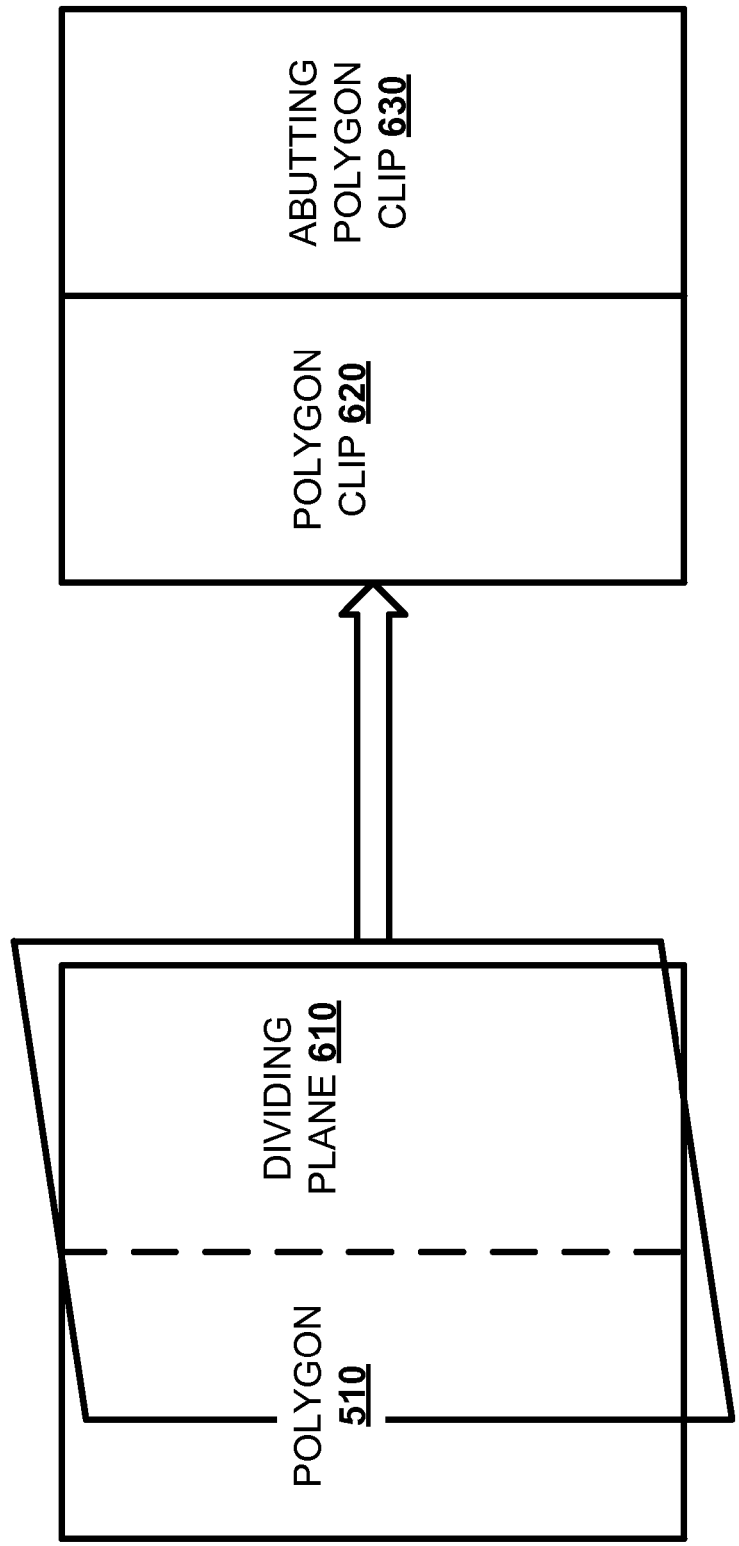

FIG. 6 illustrates, in a block diagram, an exemplary polygon clipping.

Figure 7:
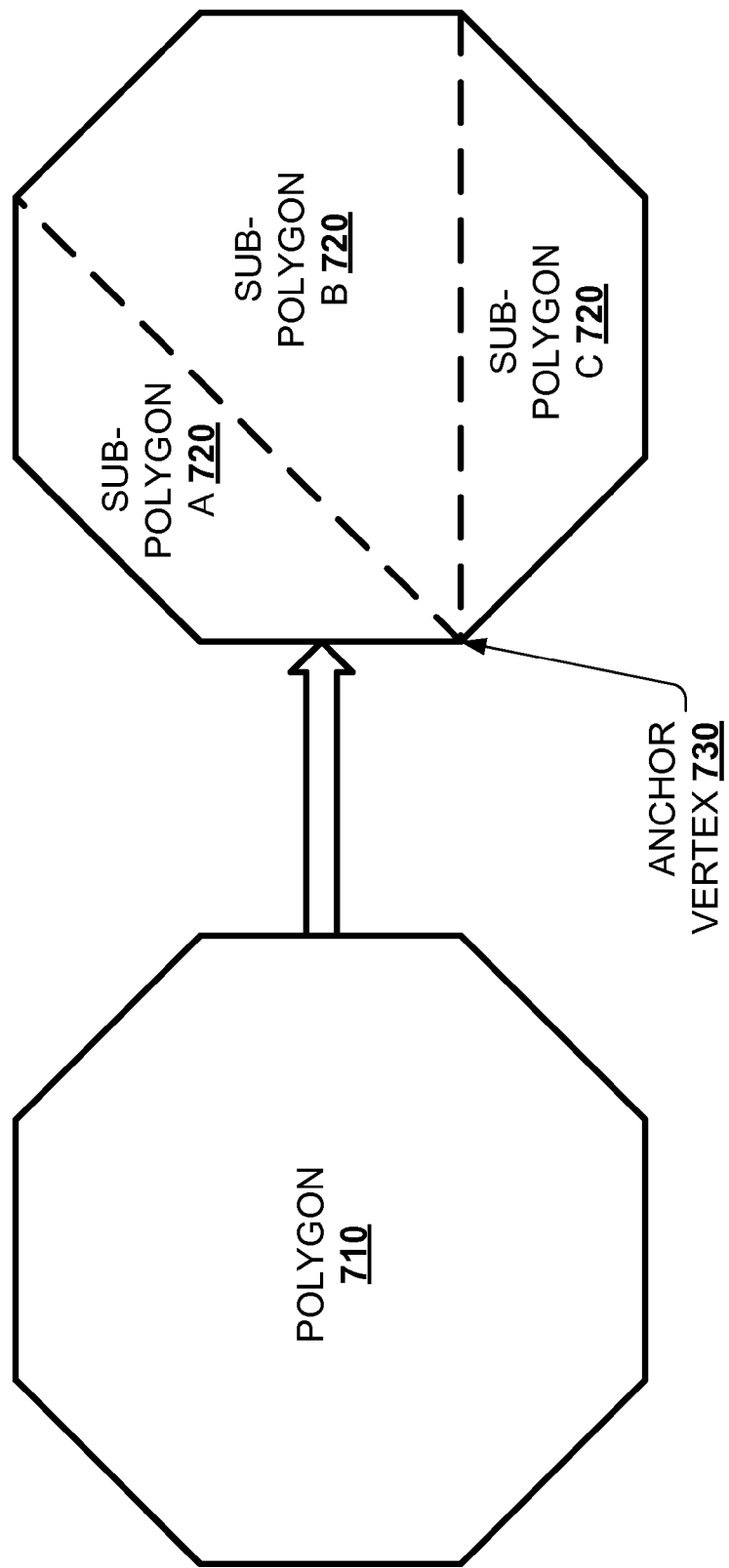

FIG. 7 illustrates, in a block diagram, an exemplary polygon tessellation.

FIG. 8 illustrates, in a block diagram, an exemplary convex polygon clip boundary.

Figure 9:
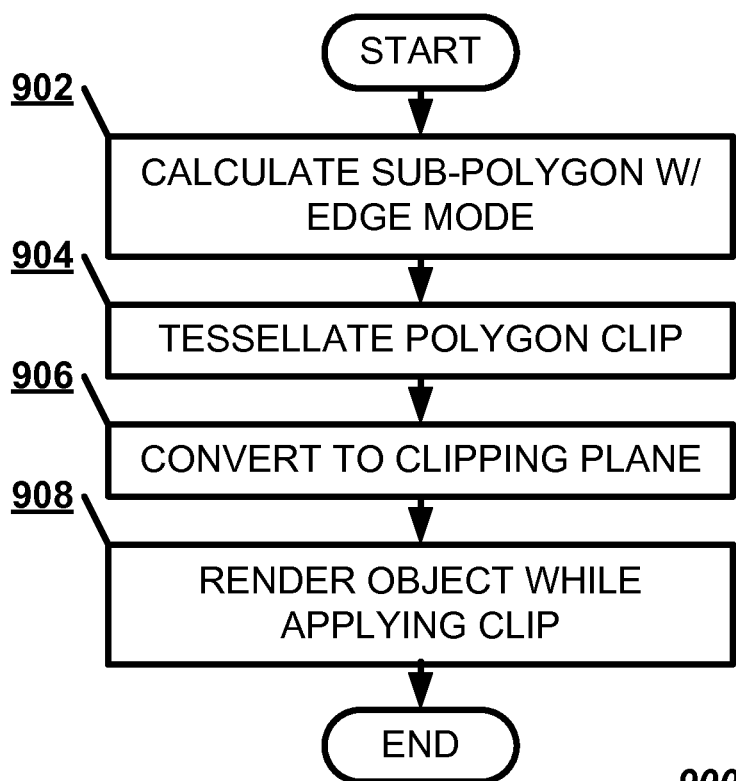

FIG. 9 illustrates, in a flowchart, an exemplary method for processing a polygon with a graphics processing unit.

Figure 10A:
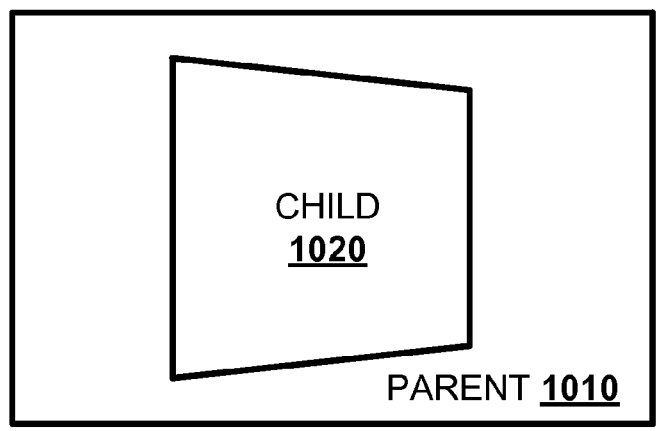
Figure 10B:
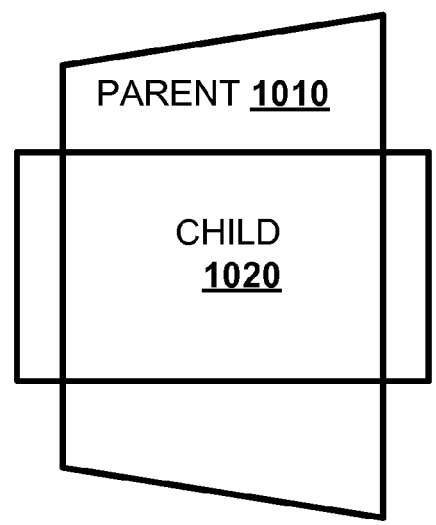
Figure 10C:
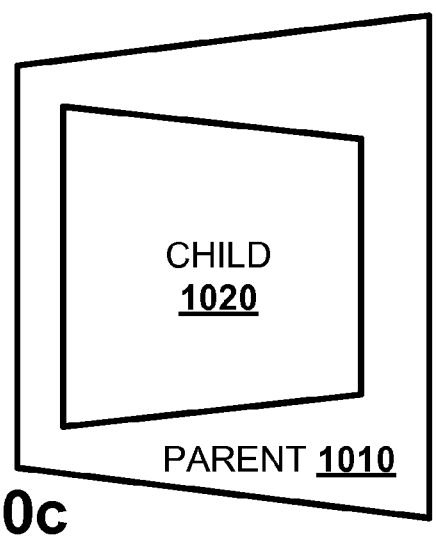

FIGS. 10a-c illustrate, in block diagrams, exemplary three-dimensional polygon sets.

Figures 11A, 11B:
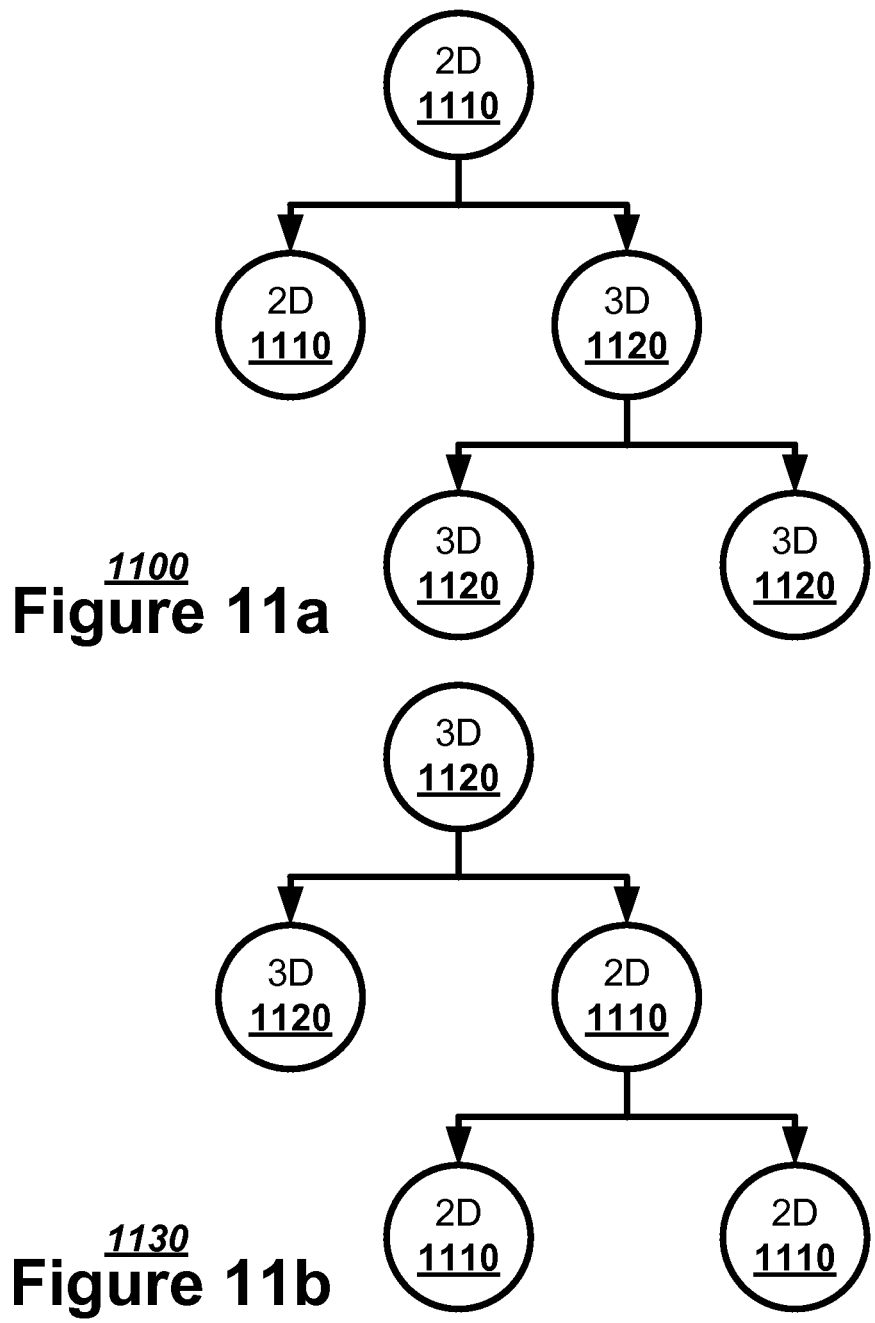
Figure 11C:
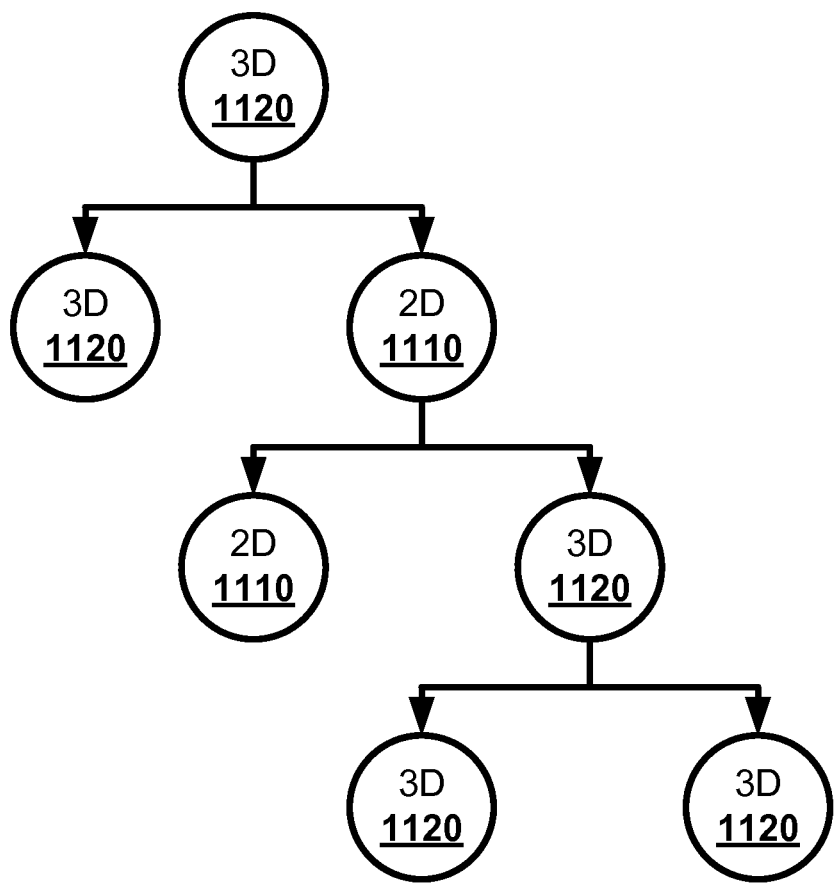

FIGS. 11a-c illustrate, in block diagrams, exemplary composition trees.

Figure 12:
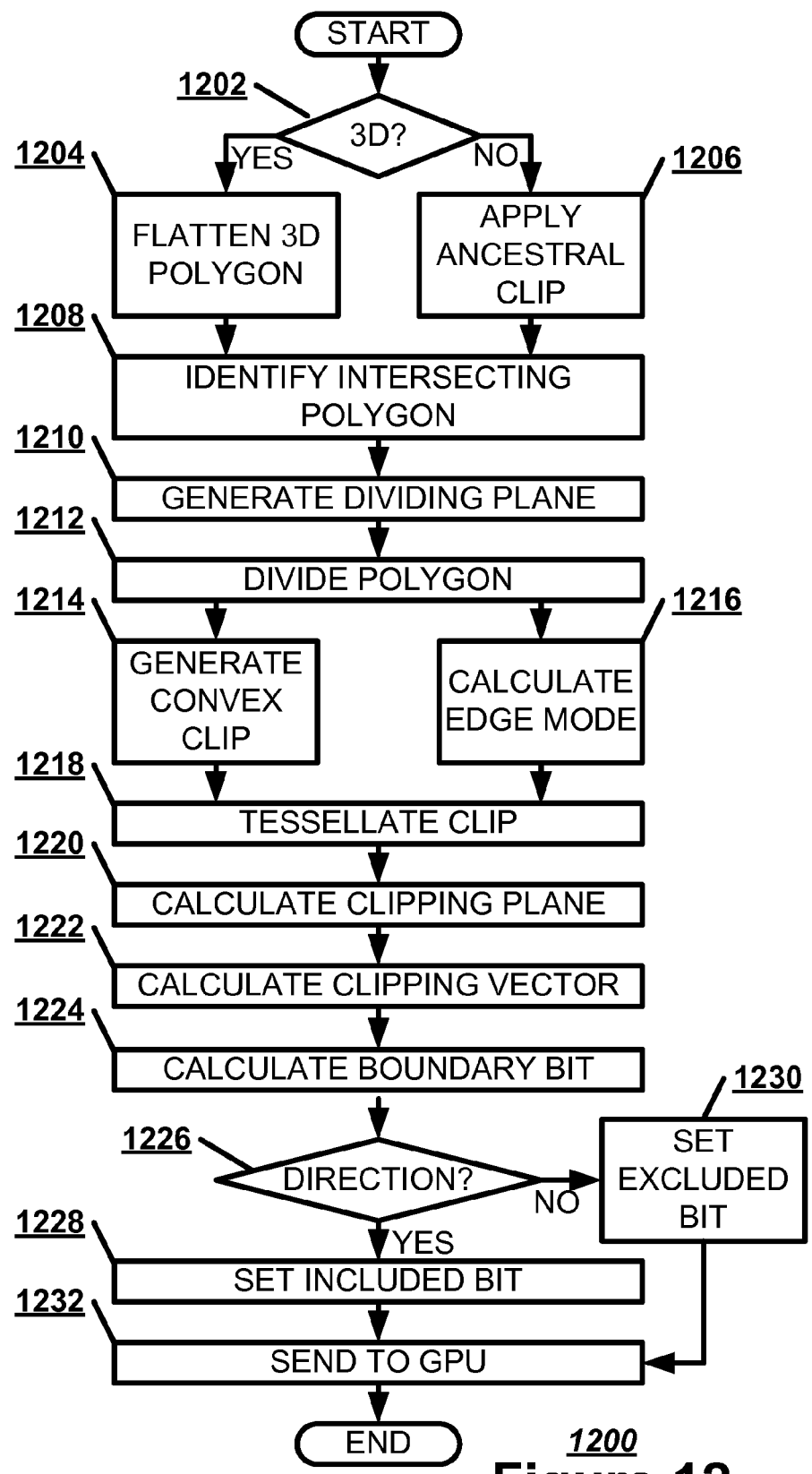

FIG. 12 illustrates, in a flowchart, an exemplary method for processing a polygon in a central processing unit.

Figure 13:
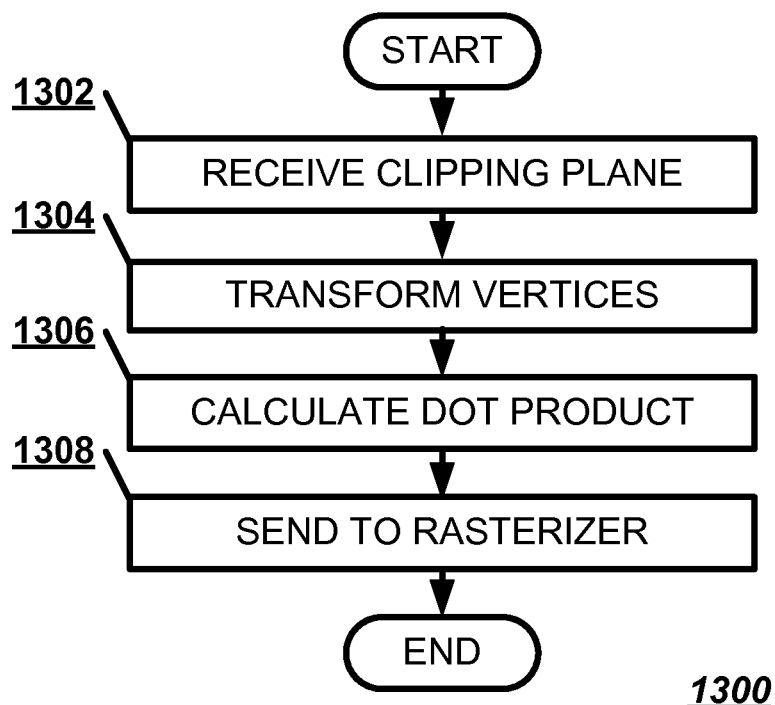

FIG. 13 illustrates, in a flowchart, an exemplary method for processing a polygon in a vertex shader.

Figure 14:
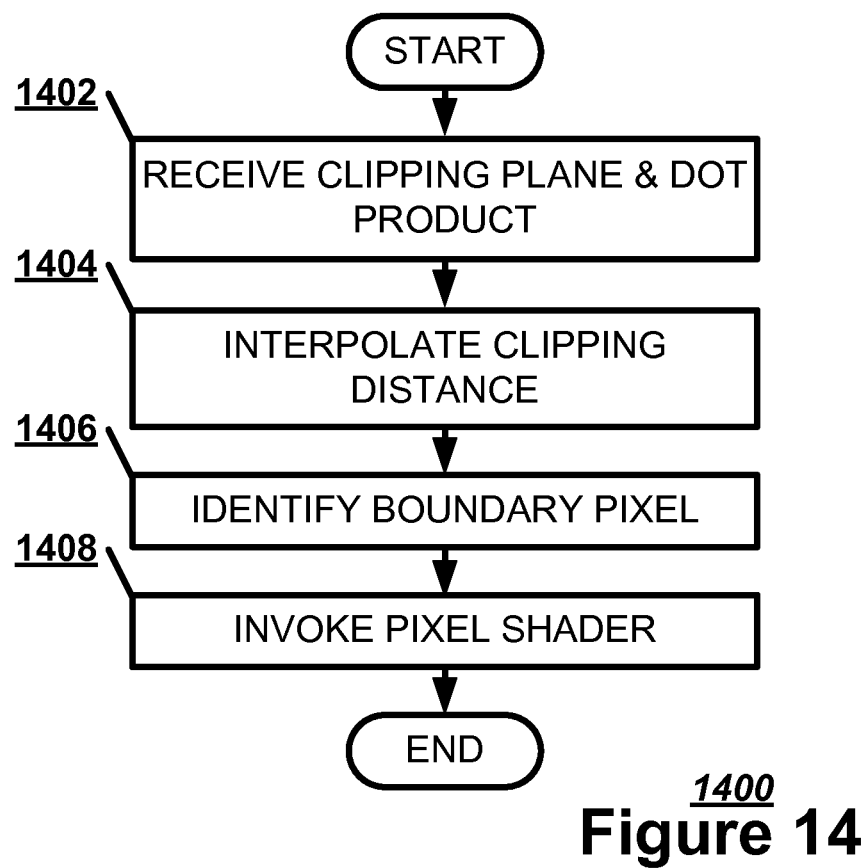

FIG. 14 illustrates, in a flowchart, an exemplary method for processing a polygon in a rasterizer.

Figure 15:
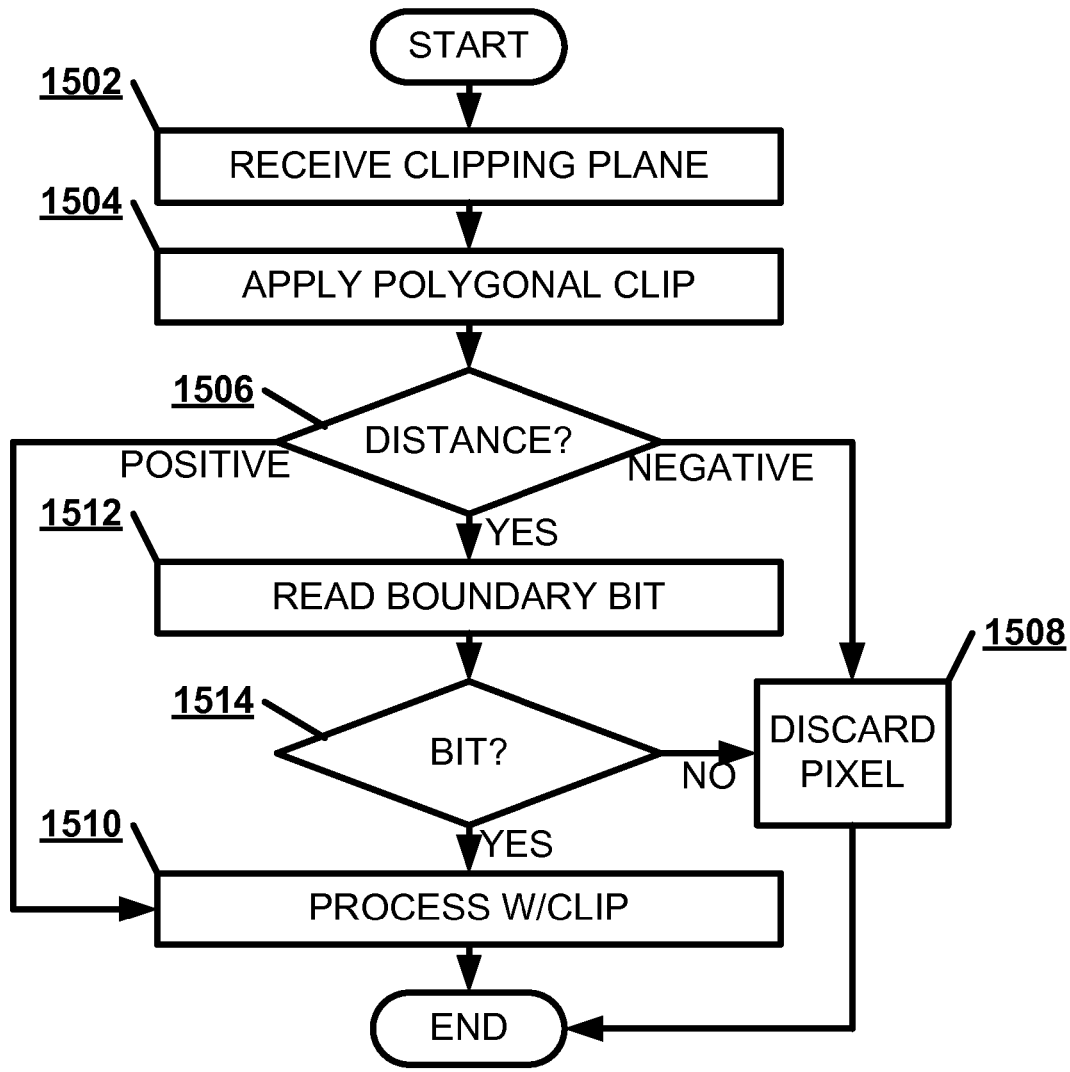

FIG. 15 illustrates, in a flowchart, an exemplary method for processing a polygon in a pixel shader.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a graphics processing unit for a computing device.

A graphics processing unit of a computing device may efficiently clip a graphic object with an arbitrary plane through efficiently applying a convex polygonal clip when rendering. A graphic object may be a bitmap, a line of text, a solid fill, a geometry, or a combination of objects. Rendering from back to front may not always be possible on a per-object basis due to intersections between objects. These intersections may result in a piece of a first object being in front of a piece of a second object, while another piece of the first object is behind the second object. In these cases, a graphics processing unit may partition the first object into several pieces to allow rendering from back to front. The graphics processing unit may clip the object during rendering to avoid accidentally rendering certain parts of the object. Because the process of partitioning an object into several pieces involves making successive cuts on various half-planes, the resulting clip may be a convex polygon. The clip may be applied in two-dimensional space by projecting the three-dimensional clip into two-dimensional space before application. By having a pixel shader of the graphics processing unit calculate an edge mode simultaneous with calculating a convex polygonal clip, the graphics processing unit may partition efficiently the first object into several pieces while maintaining the original edge mode for each piece. The edge mode of a polygon may describe whether to clip on that edge. The graphics processing unit may clip each edge of the polygon using an aliased clip. The graphics processing unit may render an object outside an edge that is not clipped. If the object boundary coincides with the clip boundary, the object may appear anti-aliased on the non-clipped edge. An anti-aliased edge has a level transparency applied to the edge to avoid a stair-step effect created by the user of pixels.

Figure 1:
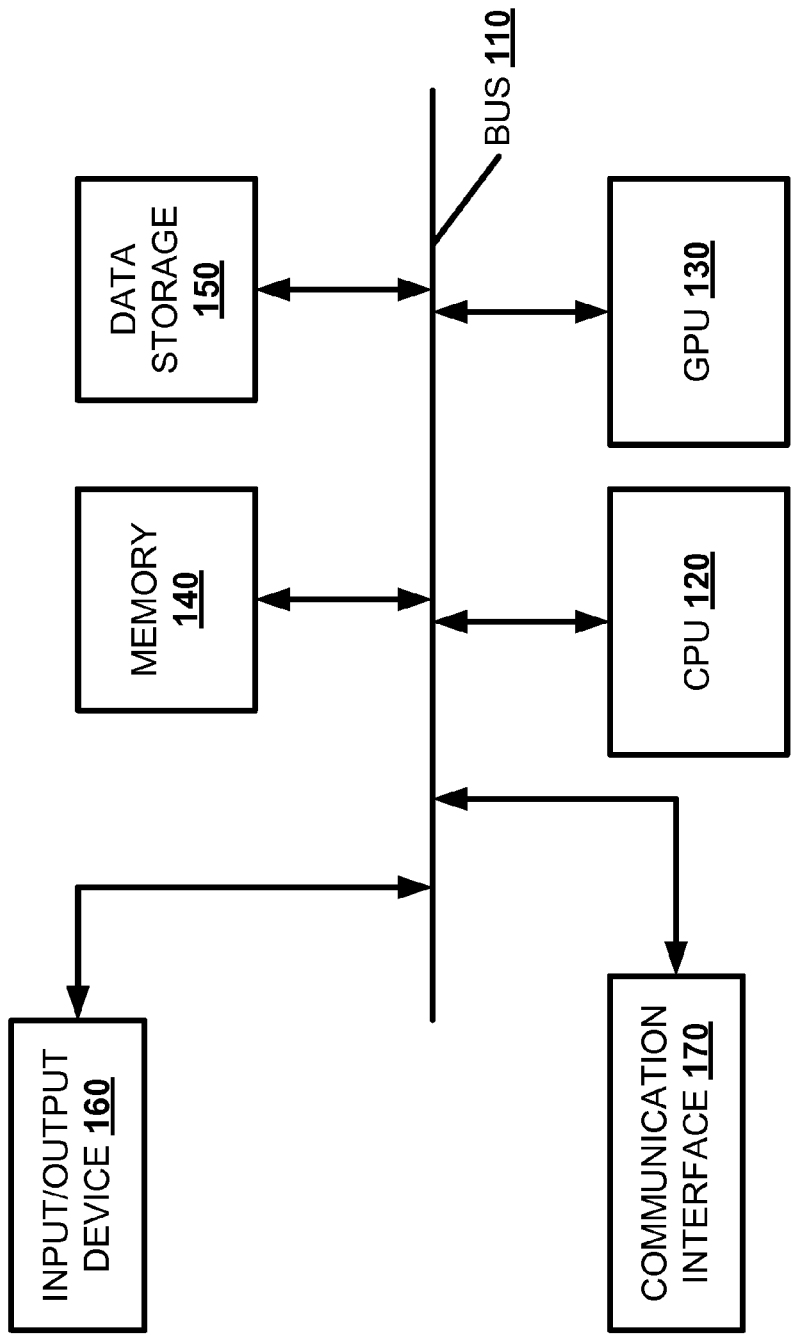
FIG. 1 illustrates, in a block diagram, an exemplary computing device.

Thus, in one example, a graphics processing unit may apply a clipping technique to accurately and efficiently render a graphic object. A central processing unit may generate a convex polygonal clip from a two-dimensional polygon. The central processing unit may calculate a clipping plane for a convex polygonal clip based on an edge of the convex polygonal clip. The central processing unit may set a boundary bit for an edge, encompassing each boundary pixel on that edge, of the convex polygonal clip to an included boundary bit indicating the boundary pixel is to be processed with the convex polygonal clip. A graphics processor may apply the convex polygonal clip in a pixel shader. FIG. 1 illustrates a block diagram of an exemplary computing device 100 which may process graphic data. The computing device 100 may combine one or more of hardware, software, firmware, and system-on-a-chip technology to process graphic data. The computing device 100 may include a bus 110, a central processing unit 120, a graphics processing unit 130, a memory 140, a data storage 150, an input/output device 160, and a communication interface 170. The bus 110, or other component interconnection, may permit communication among the components of the computing device 100.

The central processing unit 120 may include at least one conventional processor or microprocessor that interprets and executes a set of instructions. The graphics processing unit 130 may include at least one processor or microprocessor specialized for processing graphic data. The memory 140 may be a random access memory (RAM) or another type of dynamic data storage that stores information and instructions for execution by the central processing unit 120. The memory 140 also may store temporary variables or other intermediate information used during execution of instructions by the central processing unit 120. The data storage 150 may include a conventional ROM device or another type of static data storage that stores static information and instructions for the central processing unit 120. The data storage 150 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 150 may store a set of instructions detailing a method that when executed by one or more processors cause the one or more processors to perform the method. The data storage 150 may also be a database or a database interface for storing pre-compiled graphic effect modules, such as shaders.

The input/output device 160 may include one or more conventional mechanisms that permit a user to input information to the computing device 100, such as a keyboard, a mouse, a voice recognition device, a microphone, a headset, a gesture recognition device, a touch screen, etc. The input/output device 160 may include one or more conventional mechanisms that output information to the user, including a display, a printer, one or more speakers, a headset, or a medium, such as a memory, or a magnetic or optical disk and a corresponding disk drive. The communication interface 170 may include any transceiver-like mechanism that enables computing device 100 to communicate with other devices or networks. The communication interface 170 also may include a network interface or a transceiver interface. The communication interface 170 may be a wireless, wired, or optical interface.

The computing device 100 may perform such functions in response to central processing unit 120 executing sequences of instructions contained in a computer-readable medium, such as, for example, the memory 140, a magnetic disk, or an optical disk. Such instructions may be read into the memory 140 from another computer-readable medium, such as the data storage 150, or from a separate device via the communication interface 170.

Figure 2:
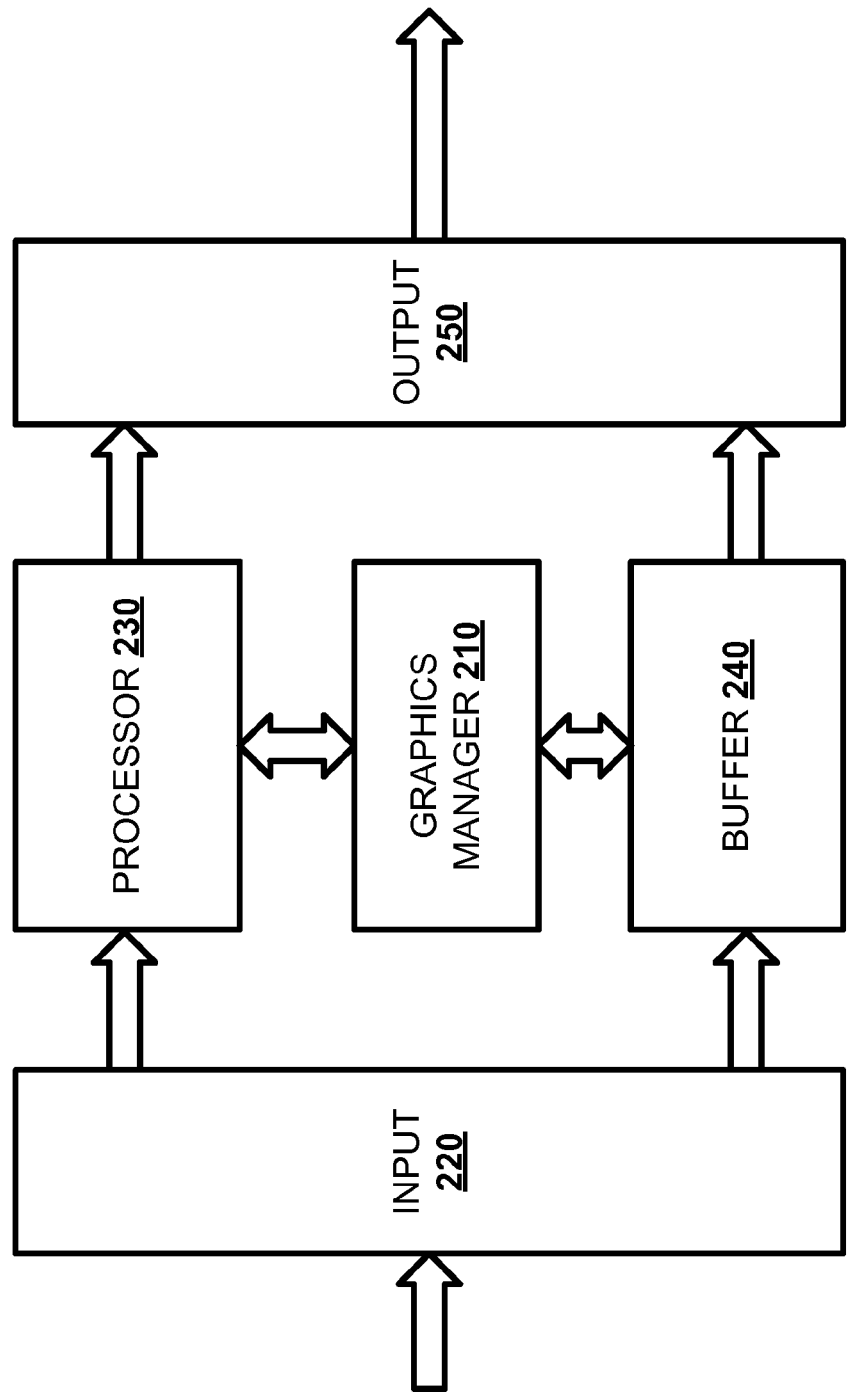
FIG. 2 illustrates, in a block diagram, an exemplary graphics processing unit.

FIG. 2 illustrates, in a block diagram, an exemplary graphics processing unit 130. The graphics processing unit 130 may have a graphics manager 210 configured to direct operations by the graphics processing unit 130. The graphics processing unit 130 may have a data input 220 for receiving a graphic data set to process for display by the computing device 100. A graphic data set may be a digital image, a graphic, a video, or other digital image.

The graphics processing unit 130 may have one or more graphics processors 230 configured to process the graphic data set. The graphics processor 230 may implement one or more graphics effects modules, such as a rasterizer or a shader, to execute the processing of the graphic data set. A rasterizer is an application that converts vector graphics to a raster, or pixel, format.

A shader is a program authored by an application developer that may be executed on a data-parallel device, such as a graphics processing unit. A shader may commonly prepare graphics data for presentation to a user. For example, the graphics processor 230 may implement a vertex shader, a geometry shader, a pixel shader, or a tessellation shader. A vertex shader may transform the three-dimensional position of each vertex of a geometry into a two-dimensional coordinate presented on a display screen. A vertex is the intersection of two or more edges of the geometry. A geometry shader may generate primitive geometries, such as points, lines, and triangles, based on input primitives. A pixel shader may compute the color and other attributes of each pixel. A tessellation shader may divide a complex geometry into a set of primitive geometries. The graphics effects modules may be compiled before being received by the graphics processing unit 130. The graphics effects modules may be optimized to be linked with other graphics effects modules at runtime for more efficient operation. Alternately, the graphics effects modules may be optimized to operate discretely, without interacting with other graphics effects modules.

The graphics processing unit 130 may have a graphics buffer 240 for storing the graphic data set and the pre-compiled graphics effects modules. The graphics processing unit 130 may have a data output 250 configured to provide the processed graphic data set.

Figure 3:
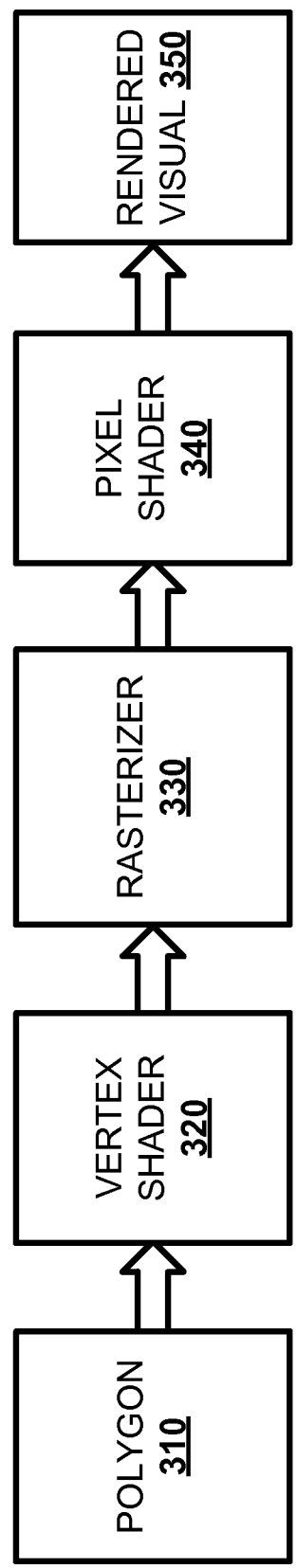
FIG. 3 illustrates, in a block diagram, an exemplary graphics processing architecture.

FIG. 3 illustrates, in a block diagram, an exemplary graphics processing architecture. A graphics processing unit 130, such as the graphics processing unit 130, may receive a polygon 310 for processing. The polygon 310 may be input into a vertex shader 320. The vertex shader 320 may transform a set of vertices representing the polygon 310 into the screen position of the polygon 310. The vertex shader 320 may pass the set of vertices to a rasterizer 330. The rasterizer 330 may identify the set of pixels composing the polygon 310 based on the set of vertices. The rasterizer 320 also may invoke a pixel shader 340 for each pixel of the set of pixels. The pixel shader 340 further may compute the color of each pixel. The pixel shader 340 then may output a rendered visual 350.

The pixel shader 340 also may discard the pixel by exiting the pixel shader invocation without writing any results to the output. By having the pixel shader 340 discard the pixel, the pixel shader 340 may clip the polygon to produce a polygon clip. A polygon clip is a portion of a polygon. The graphics processing unit 130 may use polygon clipping to render intersecting three-dimensional polygons.

FIG. 4a illustrates, in a block diagram, an exemplary three-dimensional segregated polygon set 400. The three-dimensional segregated polygon set 400 may have an original three-dimensional polygon 410, such as a first quadrilateral. The three-dimensional segregated polygon set 400 also may have a second intersecting three-dimensional polygon 420, such as a second quadrilateral. The intersecting three-dimensional polygon 420 further may be at a different planar angle than the original three-dimensional polygon 410.

FIG. 4b illustrates, in a block diagram, an exemplary three-dimensional intersecting polygon set 450. The original three-dimensional polygon 410 may intersect the intersecting three-dimensional polygon 420 along an intersection line 460. Each three-dimensional polygon may have an upper layer 470 above the intersection line 460 and a lower layer 480 below the intersection line 460. Due to transparency, the lower layer 470 may be rendered prior to the upper layer 480. The original three-dimensional polygon 410 may be clipped to allow the lower layer 470 and the upper layer 480 to be separately rendered.

Prior to the pixel shader 340 clipping the three-dimensional polygon, the graphics processing unit 130 may flatten the three-dimensional polygon into a two-dimensional polygon. FIG. 5 illustrates, in a block diagram, an exemplary polygon flattening 500. The graphics processing unit 130 may flatten the original three-dimensional polygon 410 into a flattened two-dimensional polygon 510 by eliminating a z-coordinate for the polygon. Each vertex in the original three-dimensional polygon 410 may correspond to a vertex in the flattened two-dimensional polygon 510.

FIG. 6 illustrates, in a block diagram, an exemplary polygon clipping 600. A pixel shader, such as pixel shader 340, may clip a flattened two-dimensional polygon 510 using a dividing plane 610 generated from the intersecting two-dimensional polygon 420. The dividing plane 610 may intersect with the flattened two-dimensional polygon 510 at the intersection 460. The clipping may produce a convex polygon clip 620 clipped at the intersection 460. An abutting convex polygon clip 630 may border the convex polygon clip 620 at the intersection 460.

Some graphics processing units may limit the size of the polygons that may be processed to a fixed number of edges. These limits may be circumvented by partitioning the polygon into sub-polygons. FIG. 7 illustrates, in a block diagram, an exemplary polygon tessellation 700. For example, the graphics processing unit 130 may receive a polygon 710, such as an octagon, having eight sides. The graphics processing unit 130 may partition the polygon 710 into a number of sub-polygons 720 by generating a division line from an anchor vertex 730 to other vertices in the polygon 710. For example, the graphics processing unit 130 may partition the octagon into the three quadrilaterals corresponding to sub-polygon A 720, sub-polygon B 720, and sub-polygon C 720.

FIG. 8 illustrates, in a block diagram, an exemplary convex polygon clip boundary 800. A set of interior pixels 810 may reside within the convex polygon clip 620. A set of exterior pixels 820 may reside outside the convex polygon clip 620. A vertex shader, such as the vertex shader 320, may calculate a dot product of the pixel coordinate with the clipping vector representing the clipping plane. The rasterizer, such as the rasterizer 330, may interpolate the clipping distance from the dot product and pass the clipping distance to a pixel shader. The pixel shader, such as the pixel shader 340, may determine whether a pixel lies in the convex polygon clip 620 based on the clipping distance. If the clipping distance is greater than zero, the pixel is an interior pixel 810. A pixel shader, such as pixel shader 340, may render the interior pixel 810. If the clipping distance is less than zero, the pixel is an exterior pixel 820. The pixel shader may forgo rendering the exterior pixel 820.

If the clipping distance of the pixel is zero, that pixel may be a boundary pixel resting on the edge of the convex polygon clip 620. The pixel shader may apply a secondary test to determine whether the boundary pixel is an included boundary pixel 830 to be rendered with the convex polygonal clip 620, or an excluded boundary pixel 840 not to be rendered with the convex polygonal clip 620. For the secondary test, the pixel shader may read a boundary bit for calculated by the central processing unit for the edge containing that boundary pixel. The central processing unit may set the boundary bit based on the direction of the clipping vector. The clipping vector may be normal to the edge of the clipping plane. The secondary test may produce different results for vectors pointing in the opposite direction. The differing results may ensure that the included boundary pixels 830 belong to a single convex polygon clip. The central processing unit may look at the sign of the clipping vector components to determine whether to include or exclude a boundary pixel. Alternately, the central processing unit may convert the vector to an angle and may designate half of the possible angles as being an indication to include the boundary pixel.

Incorporating the partitioning of the polygon, the graphics processing unit may process the polygon. FIG. 9 illustrates, in a flowchart, an exemplary method 900 for processing a polygon with a graphics processing unit, such as the graphics processing unit 130. The graphics processing unit may calculate a sub-polygon of the polygon, such as the polygon 410, with a corresponding edge mode as divided by an intersecting polygon, such as the intersecting polygon 420, acting as a dividing plane (Block 902). The graphics processing unit may use this calculation to determine whether the sub-polygon is part of a front layer or a back layer of the polygon. The graphics processing unit may compute the intersection of the polygon and the dividing plane by iterating the edges of the polygon, calculating the distance between a vertex and the dividing plane for each vertex of the edge. When the distance value transitions between positive and negative, the edge may span the dividing plane.

For example, if $E_1$ is a first edge of polygon P, P[i−1] and P[i] may represent the two ending vertices of $E_1$. Further, if $E_2$ is a second edge of polygon P, P[j−1] and P[j] may represent the two ending vertices of $E_2$. P'P''' may represent an intersection line between polygon P and dividing plane D. The dividing plane D may be further represented as a clipping vector. A vertex P' may represent an end vertex of an intersection line lying on edge $E_1$. A vertex P''' may represent an end vertex of an intersection line lying on edge $E_2$. The edge mode of the new edge formed by P'P''' and P'''P' may be aliased. The edge formed by vertices P[i−1] and P' and the edge formed by vertices P' and P[i] may inherit the same edge mode as edge $E_1$. The edge formed by vertices P[j−1] and P''' and the edge formed by vertices P[j] and P''' may inherit the same edge mode as edge $E_2$.

The graphics processing unit may calculate the clipping distance from each vertex to the dividing plane, based on the dot product of the clipping vector and the vertex. The graphics processing unit also may assign vertices with a positive dot product to a first layer, such as the upper layer 470. The graphics processing unit further may assign vertices with a negative clipping distance to a second layer, such as the lower layer 480. Note, the sign of the clipping distance may be relative to the viewpoint, so that a clipping distance of a vertex of a first polygon may be negative when viewed from a second polygon, but positive when viewed from the first polygon. The computation may produce a convex polygon clip.

The graphics processing unit may tessellate the convex polygon clip to create a set of sub-polygons (Block 904). Each sub-polygon may contain a pre-set maximum number of edges based on the capabilities of the graphics processing unit, such as four edges. As described above, for a pre-set maximum of four, the resulting sub-polygons may be quadrilaterals or triangles depending on the number of vertices.

The central processing unit may convert each edge of each sub-polygon into clipping planes (Block 906). The central processing unit first may flatten any three-dimensional sub-polygon by projecting that sub-polygon into a two-dimensional space. The central processing unit may represent the clipping plane as a clipping vector. The vertex shader may then calculate a dot product of that clipping vector and a pixel. The rasterizer may interpolate a clipping distance from the dot product. The pixel shader may use the clipping distance to determine whether the pixel is within the sub-polygon or outside of the sub-polygon. For example, a positive clipping distance may indicate a pixel is within the sub-polygon while a negative clipping distance indicate a pixel is outside the sub-polygon. A clipping distance of zero may indicate that the pixel is a boundary pixel.

For a boundary pixel, the central processing unit may use a secondary test to determine whether the boundary pixel is an include boundary pixel or an excluded boundary pixel. The central processing unit may base this determination on the direction of the clipping vector.

The central processing unit may ensure that a shared edge between adjacent polygons may use the same representation for the clipping plane with the signs reversed. The clipping plane may be represented in homogeneous viewport space. The clipping plane may be defined as a three-dimensional Cartesian coordinate vector, such as vector (a,b,c), referred to as a "clipping vector". The central processing unit may determine that a clipping vector representing the clipping plane for an edge labeled AB may be the same as the clipping vector representing the clipping plane for an edge labeled BA with the signs reversed.

The graphics processing unit may render the polygon while applying the convex polygon clip (Block 908). The graphics processing unit may render the polygon once for each sub-polygon. The vertex shader and the pixel shader may use the clipping planes from each previous polygon. Along with each clipping plane, the rasterizer may pass a boundary bit signifying whether a boundary pixel is an included boundary pixel or an excluded boundary pixel. If a sub-polygon does not use a passed clipping plane, the clipping plane may be represented by a zero vector to prevent that clipping plane affecting the rendered output.

For efficiency, the vertex shader may compute a clipping distance for each clipping plane. The vertex shader then may pass the clipping distance to the rasterizer, which may interpolate this clipping distance and send that clipping distance to the pixel shader. The pixel shader may determine whether the clipping distance is negative, or zero and the boundary bit signifies that a pixel is an excluded boundary pixel, and exclude these pixels from the output merger.

A graphic data set may mix two-dimensional content with three-dimensional, resulting in the above mentioned ancestral clipping polygon. The two-dimensional elements and the three-dimensional elements may be organized as a composition tree. In one example of a graphic data set, the graphics processing unit may apply a perspective transformation to a single graphical element or to an entire composition sub-tree. For an entire three dimensional sub-tree, the graphics processing unit may avoid factoring a shared virtual three dimensional space across multiple graphical elements and may avoid factoring intersections. The graphics processing unit may draw elements in tree order, just as with a two-dimensional object. If two nested two-dimensional elements have basic perspective applied with four-by-four matrices, the graphics processing unit may not have to add the three-dimensional transformations together. For example, a rotation about a vertical axis in one direction for a parent element may not cancel out a rotation about the vertical axis in the opposite direction for a child element.

FIG. 10*a* illustrates, in a block diagram, an exemplary polygon set 1000 with a three-dimensional child element. The exemplary polygon set 1000 may have a parent polygon 1010 and a child polygon 1020. The graphics processing unit may apply a three dimensional transform to the child polygon 1020 but not the parent polygon 1010, rendering just the child with a three-dimensional perspective.

FIG. 10*b* illustrates, in a block diagram, an exemplary polygon set 1030 with full three-dimensional composition. The graphics processing unit may apply a three dimensional transform to the child polygon 1020. The graphics processing unit may apply a three dimensional transform to the parent polygon 1010 in the opposite direction. The parent transform may cancel out the child transform, rendering the child polygon 1020 without a three-dimensional perspective.

FIG. 10*c* illustrates, in a block diagram, an exemplary polygon set 1060 with basic perspective applied to a two-dimensional tree with each element receiving a three-dimensional transform. The graphics processing unit may apply a three dimensional transform to the child polygon 1020. The graphics processing unit may apply a three dimensional transform to the parent polygon 1010 in the opposite direction. The parent transform may not cancel out the child transform, allowing both elements to show a three-dimensional perspective.

As is the case with full three-dimensional composition, the graphics processing unit may apply basic perspective to a two-dimensional element using intermediate textures. Alternately, the graphics processing unit may apply an additional flattening transformation to the child by multiplying a modified identity matrix. The graphics processing unit may modify the identity matrix by setting the (3,3) element to zero, producing the matrix:

$$\begin{pmatrix} 1000 \\ 0100 \\ 0000 \\ 0001 \end{pmatrix}$$

The graphics processing unit then may render the child without an intermediate texture by multiplying the parent's matrix with the modified identity matrix. The graphics processing unit then may multiply the result by the child's matrix. The graphics processing unit may apply the overall final matrix to graphical element to produce the final result. For a full three dimensional composition, the graphics processing unit may omit the modified identity matrix, allowing the parent and child matrices to interact directly and possibly cancel each other out.

The graphics processing unit may process the three-dimensional elements for back-to-front rendering. Conversely, the graphics processing unit may render the two-dimensional elements in tree order, without any additional sorting or special clipping.

When a sub-tree of a given dimensionality is nested in a composite tree of a different dimensionality, the graphics processing unit may treat the entire sub-tree as a single large graphical element. For example, the graphics processing unit may first rasterize the entire nested sub-tree into an off-screen intermediate texture, then use that texture as a single graphical element within the larger sub-tree. While producing the correct semantic result, this approach may use a great amount of graphical memory and graphical processing power to produce, store and consume the intermediate bitmap. This approach may be onerous for multiple levels of nesting, leading to dropped animation frames and potential resource exhaustion. Additionally, going through intermediate textures may reduce the quality of the final result, with repeated bitmap transformations leading to pixilation and other undesirable sampling artifacts.

In a composition tree that has mixed two-dimensional content and three-dimensional content, a two-dimensional composite tree may have a sub-tree representing an island of three-dimensional content. FIG. 11a illustrates, in a block diagram, an exemplary two-dimensional composite tree 1100 with a three-dimensional sub-tree. The two-dimensional composite tree 1100 may have a root node of a two-dimensional element 1110. The two-dimensional composite tree 1100 may have one or more three-dimensional elements 1120 on a lower branch.

To render the two-dimensional composite tree having a three-dimensional sub-tree, the graphics processing unit may render the elements of the composite tree in tree order, with no additional sorting or clipping, until reaching the three-dimensional sub-tree. At that point, the graphics processing unit may analyze the entire three-dimensional sub-tree as a unit, producing a binary space partitioning tree that defines a new rendering order resolving any three-dimensional occlusion and intersections. The graphics processing unit may render the entire three-dimensional sub-tree, with clipping used whenever an element is split according to a binary space partitioning tree. Once the graphics processing unit has rendered the entire three-dimensional sub-tree, the graphics processing unit may continue to render the two dimensional tree normally. In other words, the graphics processing unit may render the entire island of three dimensional content with its two dimensional siblings, with each elements encountered before the three-dimensional sub-tree being rendered behind and each elements encountered after rendered in front.

Alternately, a three-dimensional composite tree may have a sub-tree representing an island of two-dimensional content. FIG. 11b illustrates, in a block diagram, an exemplary three-dimensional composite tree 1130 with a two-dimensional sub-tree. The two-dimensional composite tree 1100 may have a root node of a three-dimensional element 1120. The three-dimensional composite tree 1130 may have one or more two-dimensional elements 1110 on a lower branch.

When analyzing a three-dimensional composition tree and building the accompanying binary space partitioning tree, the graphics processing unit may treat the two-dimensional sub-tree as a single unit for three-dimensional composition purposes. The graphics processing unit may render the two-dimensional sub-tree in a single plane, transformed into three-dimensional space, as appropriate, by the ancestor nodes in the three-dimensional composition tree.

When the binary space partitioning tree is built, the graphics processing unit may treat the entire two-dimensional sub-tree as a single planar polygon. The graphics processing unit may set the size of the single planar polygon to the bounding box of the two-dimensional sub-tree for efficiency. The graphics processing unit may analyze the single planar polygon for the entire two-dimensional sub-tree against other polygons, with potential splitting by the resulting binary space partitioning tree.

When the binary space partitioning tree is traversed for rendering, the graphics processing unit may visit the single planar polygon multiple times, if split in the binary space partitioning tree building process. Every time the single planar polygon is visited, the graphics processing unit may perform the same three-dimensional transformation and a different clipping polygon. Each time the single planar polygon is visited, the graphics processing unit may traverse the entire two-dimensional sub-tree with the given transformation and clipping polygon. The graphics processing unit may apply the transformation to every graphical element in the two-dimensional sub-tree, and may use the clipping polygon to constrain the rendering of each of those elements.

The graphics processing unit potentially may process the two-dimensional sub-tree multiple times, but each time may render a different set of pixels corresponding to the different clipping polygons applied. Because the graphics processing unit may apply the clipping polygons to the entire two-dimensional sub-tree, the graphics processing unit may correctly sort the entire tree with other three-dimensional polygons, including handling multiple intersections, but without the use of any intermediate surfaces.

Since two-dimensional sub-trees may contain three-dimensional sub-trees and vice-versa, this nesting may happen with arbitrary depth. FIG. 11c illustrates, in a block diagram, an exemplary three-dimensional composite tree 1160 with multiple recursive nestings. The two-dimensional composite tree 1100 may have a root node of a three-dimensional element 1120. The three-dimensional composite tree 1160 may have one or more two-dimensional elements 1110 on a lower branch. Those two-dimensional elements 1110 may be the root node for a three-dimensional element 1120 on an even lower branch.

To handle multiple recursive nestings, the graphics processing unit may generate for each root node of a three-dimensional sub-tree an independent binary space partitioning tree. The graphics processing unit may construct the independent binary space partitioning tree with respect to that root node, not the root node of the overall composition tree. This generation based on the root node of a three-dimensional sub-tree may allow independent three-dimensional sub-trees to be rendered independently. Thus, the graphics processing unit may consider the two-dimensional elements 1110 in a two-dimensional sub-tree as single planes, even with applied perspective. Therefore, the binary space partitioning tree for a three-dimensional sub-tree may not consider any three-dimensional transformations above that sub-tree, as higher elements may be flattened. The graphics processing unit may ignore two-dimensional transformations as having no effect on occlusion or visibility. Thus, changes to transformations outside of the three-dimensional sub-tree may not invalidate the binary space partitioning tree built for that three-dimensional sub-tree.

The graphics processing unit may apply a clipping polygon that is the result of any ancestral binary space partitioning trees to a two-dimensional tree, having combined that clipping polygon with any additional two-dimensional clipping that may be present in the two-dimensional sub-tree. The graphics processing unit may apply the clipping polygon in effect at the root of a three-dimensional sub-tree to the entire binary space partitioning tree built at that root node.

FIG. 12 illustrates, in a flowchart, an exemplary method 1200 for processing a polygon in a central processing unit, such as the central processing unit 120. If the polygon is a three-dimensional polygon (Block 1202), the central processing unit may flatten a three-dimensional polygon to a two-dimensional polygon (Block 1204). If the polygon is a two-dimensional polygon that is part of a larger three-dimensional structure (Block 1202), the central processing unit may apply an ancestral clip to the two-dimensional polygon (Block 1206). The central processing unit may identify an intersecting polygon that intersects with the two-dimensional polygon (Block 1208). The central processing unit may generate a dividing plane for the two-dimensional polygon from the intersecting polygon (Block 1210). The central processing unit further may divide the two-dimensional polygon with the dividing plane (Block 1212). The central processing unit further more may generate a convex polygonal clip from the two-dimensional polygon (Block 1214). The central processing unit further may calculate an edge mode simultaneous with the convex polygonal clip (Block 1216). The central processing unit further more may tessellate the polygonal clip into a sub-polygon having no more than a pre-set number of edges (Block 1218). The central processing unit then calculate a clipping plane for the convex polygonal clip based on an edge of the convex polygonal clip (Block 1220). The central processing unit may calculate a clipping vector based on the clipping plane (Block 1222). The central processing unit further may calculate a boundary bit for a boundary pixel based on a direction of the clipping vector (Block 1224). If the direction of the clipping vector indicates a boundary pixel is included with the convex polygonal clip (Block 1226), the central processing unit may set the boundary bit for the boundary pixel to an included boundary bit indicating the boundary pixel is to be processed with the convex polygonal clip (Block 1228). Alternately, if the direction of the clipping vector indicates a boundary pixel is excluded from the convex polygonal clip (Block 1226), the central processing unit may set the boundary bit for the boundary pixel to an excluded boundary bit indicating the boundary pixel is to be discarded (Block 1230). The central processing unit then may send the clipping plane to the graphics processing unit (Block 1232).

FIG. 13 illustrates, in a flowchart, an exemplary method 1300 for processing a polygon in a vertex shader, such as the vertex shader 320. The vertex shader may receive a clipping plane from the central processing unit (Block 1302). The vertex shader transform a set of vertices for the clipping plane into the screen position for the convex polygonal clip (Block 1304). The vertex shader may calculate a dot product for a pixel with the clipping vector (Block 1306). The vertex shader then may send the clipping plane and the dot product to the rasterizer (Block 1308).

FIG. 14 illustrates, in a flowchart, an exemplary method 1400 for processing a polygon in a rasterizer, such as the rasterizer 330. The rasterizer may receive a dot product from the vertex shader (Block 1402). The rasterizer also may interpolate a clipping distance based on the dot product (Block 1404). The rasterizer may identify a boundary pixel on a clipping boundary of the convex polygonal clip (Block 1406). The rasterizer then may invoke the pixel shader (Block 1408).

FIG. 15 illustrates, in a flowchart, an exemplary method 1500 for processing a polygon in a pixel shader, such as the pixel shader 340. The pixel shader may receive the clipping distance (Block 1502). The pixel shader may apply a convex polygonal clip (Block 1504). If the clipping distance is negative, indicating the pixel is outside the convex polygonal clip (Block 1506), the pixel shader may discard the pixel (Block 1508). If the clipping distance is positive, indicating the pixel is within the convex polygonal clip (Block 1506), the pixel shader may process the pixel with the convex polygonal clip (Block 1510). If the clipping distance is zero, indicating the pixel is a boundary pixel (Block 1506), the pixel shader may read the boundary bit (Block 1512). If the pixel is a boundary pixel with a boundary bit set to an included boundary bit (Block 1514), the pixel shader may process the pixel with the convex polygonal clip (Block 1510). Alternately, if the pixel is a boundary pixel with a boundary bit set to an excluded boundary bit (Block 1514), the pixel shader may discard the pixel (Block 1508).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method of rendering a graphic object to produce a rendered visual, comprising:
   identifying an intersecting polygon that intersects with a two-dimensional polygon in the graphic object;
   generating a dividing plane for the two-dimensional polygon from the intersecting polygon;
   dividing the two-dimensional polygon with the dividing plane to generate a convex polygonal clip from the two-dimensional polygon;
   calculating a clipping plane for each edge of the convex polygonal clip to determine whether pixels are within the convex polygonal clip;
   applying the convex polygonal clip in a pixel shader; and
   rendering the graphic object, by a graphic processing unit (GPU), while applying the convex polygonal clip in the pixel shader.

2. The method of claim 1, further comprising:
   flattening a three-dimensional polygon to the two-dimensional polygon.

3. The method of claim 1, further comprising:
   interpolating a clipping distance for a pixel based on a dot product of the pixel and a clipping vector representing the clipping plane.

4. The method of claim 1, further comprising:
   identifying a boundary pixel on a clipping boundary of the convex polygonal clip.

5. The method of claim 1, further comprising:
   calculating a clipping vector based on the clipping plane.

6. The method of claim 1, further comprising:
   calculating a boundary bit based on a direction of a clipping vector.

7. The method of claim 1, further comprising:
   setting a boundary bit for a boundary pixel to an included boundary bit indicating the boundary pixel is to be processed with the convex polygonal clip.

8. The method of claim 1, further comprising:
   setting a boundary bit for a boundary pixel to an excluded boundary bit indicating the boundary pixel is to be discarded.

9. The method of claim 1, further comprising:
   calculating an edge mode simultaneous with the convex polygonal clip.

10. The method of claim 1, further comprising:
    tessellating the convex polygonal clip into a plurality of sub-polygons having no more than a pre-set number of edges.

11. The method of claim 1, further comprising:
    applying an ancestral polygon clip in the pixel shader.

12. A tangible machine-readable medium having a set of instructions detailing a method stored thereon that when executed by a processing system, having one or more processors, cause the processing system to perform:
    dividing a two-dimensional polygon of a graphic object with a dividing plane to generate a convex polygonal clip from the two-dimensional polygon;
    calculating a clipping plane for each edge of the convex polygonal clip to determine whether pixels are within the convex polygonal clip;
    calculating a clipping vector based on the clipping plane;
    calculating a boundary bit for a boundary pixel on a clipping boundary of the convex polygonal clip based on a direction of the clipping vector;
    setting the boundary bit to an included boundary bit indicating the boundary pixel is to be processed with the convex polygonal clip;
    applying the convex polygonal clip in a pixel shader; and
    rendering the graphic object, by the one or more processors, while applying the convex polygonal clip in the pixel shader.

13. The tangible machine-readable medium of claim 12, wherein the method further comprises:
    flattening the two-dimensional polygon from a three-dimensional polygon.

14. The tangible machine-readable medium of claim 12, wherein the method further comprises:
    calculating a dot product for a pixel with the clipping vector.

15. The tangible machine-readable medium of claim 12, wherein the method further comprises:
    interpolating a clipping distance for a pixel based on a dot product of the pixel and the clipping vector.

16. The tangible machine-readable medium of claim 12, wherein the method further comprises:
    calculating an edge mode simultaneous with the convex polygonal clip.

17. The tangible machine-readable medium of claim 12, wherein the method further comprises:
    tessellating the convex polygonal clip into a plurality of sub-polygons having no more than a pre-set number of edges.

18. A graphics processing unit, comprising:
    a data input configured to receive a clipping plane for each edge of a convex polygonal clip and a boundary bit for a boundary pixel on a clipping boundary of the convex polygonal clip calculated based on a direction of a clipping vector representing the clipping plane;
    a graphics buffer configured to store the clipping plane and the boundary bit;
    a processor configured to execute a pixel shader to apply the convex polygonal clip; and
    wherein the processor is configured to render a graphic object while applying the convex polygonal clip in the pixel shader.

19. The graphics processing unit of claim 18, wherein the boundary bit is set to at least one of an included boundary bit indicating the boundary pixel is to be processed with the convex polygonal clip and an excluded boundary bit indicating the boundary pixel is to be discarded.

* * * * *